United States Patent
Bhaya et al.

(10) Patent No.: US 10,643,608 B2
(45) Date of Patent: *May 5, 2020

(54) FEEDBACK CONTROLLER FOR DATA TRANSMISSIONS

(71) Applicant: Google LLC, Mountain View, CA (US)

(72) Inventors: Gaurav Bhaya, Sunnyvale, CA (US); Robert James Stets, Jr., Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,367

(22) Filed: Aug. 19, 2019

(65) Prior Publication Data

US 2019/0371306 A1 Dec. 5, 2019

Related U.S. Application Data

(63) Continuation of application No. 15/395,694, filed on Dec. 30, 2016, now Pat. No. 10,431,209.

(51) Int. Cl.
*G10L 15/18* (2013.01)
*G10L 15/22* (2006.01)
(Continued)

(52) U.S. Cl.
CPC ...... *G10L 15/1822* (2013.01); *G06F 16/3329* (2019.01); *G06F 16/3344* (2019.01);
(Continued)

(58) Field of Classification Search
CPC .. G10L 15/1822; G10L 15/22; G06F 17/2705
See application file for complete search history.

(56) References Cited

U.S. PATENT DOCUMENTS 4,603,430 A 7/1986 Sacks
5,542,107 A * 7/1996 Kay ..................... H04B 7/0671
455/101

(Continued)

FOREIGN PATENT DOCUMENTS

CA 2633177 A1 12/2009
CN 101410815 4/2009
(Continued)

OTHER PUBLICATIONS

"Walmart and Google to offer voice-enabled shopping", BBC News, Aug. 23, 2017 (10 pages).
(Continued)

*Primary Examiner* — Samuel G Neway
(74) *Attorney, Agent, or Firm* — Foley & Lardner LLP; James De Vellis

(57) ABSTRACT

A feedback control system for data transmissions in voice activated data packet based computer network environment is provided. A system can receive audio signals detected by a microphone of a device. The system can parse the audio signal to identify trigger keyword and request. The system can select a content item using the trigger keyword or request. The content item can be configured to establish a communication session between the device and a third party device. The system can monitor the communication session to measure a characteristic of the communication session. The system can generate a quality signal based on the measured characteristic.

20 Claims, 4 Drawing Sheets

(51) Int. Cl.
    *G06F 16/332*     (2019.01)
    *G06F 16/33*      (2019.01)
    *H04M 3/22*       (2006.01)
    *H04M 3/493*      (2006.01)
    *H04L 29/06*      (2006.01)
    *H04L 29/08*      (2006.01)
    *G06F 16/9032*    (2019.01)
    *G06F 40/205*     (2020.01)
    *H04B 17/309*     (2015.01)
    *G10L 25/69*      (2013.01)
    *G10L 25/87*      (2013.01)
    *G10L 25/90*      (2013.01)
    *G10L 15/08*      (2006.01)

(52) U.S. Cl.
    CPC ...... *G06F 16/90332* (2019.01); *G06F 40/205* (2020.01); *G10L 15/22* (2013.01); *G10L 25/69* (2013.01); *G10L 25/87* (2013.01); *G10L 25/90* (2013.01); *H04B 17/309* (2015.01); *H04L 65/1069* (2013.01); *H04L 65/602* (2013.01); *H04L 65/80* (2013.01); *H04L 67/20* (2013.01); *H04L 67/22* (2013.01); *H04L 67/42* (2013.01); *H04M 3/2236* (2013.01); *H04M 3/4931* (2013.01); *G10L 2015/088* (2013.01)

(56) References Cited

U.S. PATENT DOCUMENTS

| | | | |
|---|---|---|---|
| 5,581,686 A | 12/1996 | Koppolu et al. | |
| 5,608,727 A * | 3/1997 | Perreault | H04J 1/12 370/462 |
| 6,275,806 B1 | 8/2001 | Pertrushin | |
| 6,684,249 B1 | 1/2004 | Frerichs et al. | |
| 6,771,390 B1 | 8/2004 | Weidlich | |
| 6,857,007 B1 | 2/2005 | Bloomfield | |
| 7,003,729 B1 | 2/2006 | Rajala et al. | |
| 7,219,309 B2 | 5/2007 | Kaasila et al. | |
| 7,222,306 B2 | 5/2007 | Kaasila et al. | |
| 7,337,392 B2 | 2/2008 | Lue | |
| 7,853,255 B2 | 12/2010 | Karaoguz et al. | |
| 7,865,404 B2 | 1/2011 | Peckover | |
| 7,877,696 B2 | 1/2011 | Telek et al. | |
| 7,900,137 B2 | 3/2011 | Ivarsoy et al. | |
| 7,925,138 B2 | 4/2011 | Ando et al. | |
| 7,962,522 B2 | 6/2011 | Norris, III | |
| 7,964,841 B2 | 6/2011 | Imai | |
| 8,151,183 B2 | 4/2012 | Chen et al. | |
| 8,195,133 B2 | 6/2012 | Ramer et al. | |
| 8,208,788 B2 | 6/2012 | Ando et al. | |
| 8,265,220 B2 * | 9/2012 | Komaili | G10L 19/24 375/219 |
| 8,302,000 B2 | 10/2012 | Uehori | |
| 8,386,386 B1 | 2/2013 | Zhu | |
| 8,402,379 B2 | 3/2013 | Barak | |
| 8,413,070 B1 | 4/2013 | Castrucci et al. | |
| 8,448,074 B2 | 5/2013 | Forutanpour et al. | |
| 8,453,051 B1 | 5/2013 | Weiss et al. | |
| 8,510,237 B2 | 8/2013 | Cascaval et al. | |
| 8,756,523 B2 | 6/2014 | Chiba et al. | |
| 8,903,716 B2 | 12/2014 | Chen et al. | |
| 8,914,753 B2 | 12/2014 | Miyata | |
| 8,938,672 B2 | 1/2015 | Desantis et al. | |
| 9,014,483 B2 | 4/2015 | Ito et al. | |
| 9,164,966 B1 | 10/2015 | Llach et al. | |
| 9,183,319 B2 | 11/2015 | Joel et al. | |
| 9,542,956 B1 | 1/2017 | Nostrant | |
| 9,703,757 B2 | 7/2017 | Rimmer et al. | |
| 10,431,209 B2 * | 10/2019 | Bhaya | G10L 15/22 |
| 2001/0016034 A1 | 8/2001 | Singh et al. | |
| 2002/0178005 A1 * | 11/2002 | Dusan | G06F 17/271 704/254 |
| 2003/0023656 A1 | 1/2003 | Hutchison et al. | |
| 2004/0056894 A1 | 3/2004 | Zaika et al. | |
| 2004/0098251 A1 * | 5/2004 | Vainio | G10L 19/18 704/201 |
| 2004/0141016 A1 | 7/2004 | Fukatsu et al. | |
| 2004/0177316 A1 | 9/2004 | Layzell et al. | |
| 2005/0060709 A1 | 3/2005 | Kanai et al. | |
| 2005/0086345 A1 | 4/2005 | Philyaw et al. | |
| 2006/0103667 A1 | 5/2006 | Amit et al. | |
| 2006/0242017 A1 | 10/2006 | Libes et al. | |
| 2006/0253796 A1 | 11/2006 | Wang et al. | |
| 2007/0005433 A1 | 1/2007 | Lee et al. | |
| 2007/0019549 A1 * | 1/2007 | Okabe | H04L 29/06027 370/232 |
| 2007/0097975 A1 | 5/2007 | Rakers et al. | |
| 2007/0118797 A1 | 5/2007 | Layzell | |
| 2007/0127688 A1 | 6/2007 | Doulton | |
| 2008/0037656 A1 | 2/2008 | Hannuksela | |
| 2008/0114747 A1 * | 5/2008 | Goller | G06F 3/167 |
| 2008/0147388 A1 * | 6/2008 | Singh | G10L 15/1822 704/226 |
| 2008/0235574 A1 | 9/2008 | Telek et al. | |
| 2009/0085921 A1 | 4/2009 | Do et al. | |
| 2009/0132578 A1 | 5/2009 | Parikh et al. | |
| 2009/0183065 A1 | 7/2009 | Endo et al. | |
| 2009/0279108 A1 | 11/2009 | Hoshi et al. | |
| 2009/0300120 A1 | 12/2009 | Schmidt | |
| 2009/0327032 A1 | 12/2009 | Gunawardana et al. | |
| 2010/0011316 A1 | 1/2010 | Sar et al. | |
| 2010/0082780 A1 | 4/2010 | Muilenburg et al. | |
| 2010/0199209 A1 | 8/2010 | Sueoka et al. | |
| 2010/0199210 A1 | 8/2010 | Harada et al. | |
| 2010/0199211 A1 | 8/2010 | Igawa et al. | |
| 2010/0325430 A1 | 12/2010 | Denninghoff | |
| 2011/0093605 A1 * | 4/2011 | Choudhury | H04L 65/4084 709/231 |
| 2011/0258562 A1 | 10/2011 | Zhu et al. | |
| 2012/0060111 A1 | 3/2012 | Kim | |
| 2012/0158490 A1 | 6/2012 | Neumeyer et al. | |
| 2012/0159314 A1 | 6/2012 | Schrier et al. | |
| 2012/0165009 A1 | 6/2012 | Oba et al. | |
| 2012/0265528 A1 | 10/2012 | Gruber et al. | |
| 2013/0007602 A1 | 1/2013 | Dougherty et al. | |
| 2013/0021377 A1 | 1/2013 | Doll | |
| 2013/0024757 A1 | 1/2013 | Doll et al. | |
| 2013/0089098 A1 | 4/2013 | Mital et al. | |
| 2013/0117022 A1 | 5/2013 | Chen et al. | |
| 2013/0174047 A1 | 7/2013 | Sivakumar et al. | |
| 2013/0275164 A1 | 10/2013 | Gruber et al. | |
| 2013/0298085 A1 | 11/2013 | Kritt et al. | |
| 2013/0304758 A1 | 11/2013 | Gruber et al. | |
| 2013/0305144 A1 | 11/2013 | Jackson et al. | |
| 2013/0305145 A1 | 11/2013 | Jackson et al. | |
| 2014/0033228 A1 | 1/2014 | Lucash | |
| 2014/0108941 A1 | 4/2014 | Joel et al. | |
| 2014/0180796 A1 | 6/2014 | Sas et al. | |
| 2014/0222436 A1 | 8/2014 | Binder et al. | |
| 2014/0258849 A1 | 9/2014 | Chung et al. | |
| 2014/0281918 A1 | 9/2014 | Wei et al. | |
| 2015/0019957 A1 | 1/2015 | Ying et al. | |
| 2015/0066479 A1 | 3/2015 | Pasupalak et al. | |
| 2015/0088970 A1 | 3/2015 | Wei et al. | |
| 2015/0095768 A1 | 4/2015 | Rimmer et al. | |
| 2015/0242908 A1 | 8/2015 | Kobyakov et al. | |
| 2015/0350598 A1 * | 12/2015 | Yang | H04W 24/08 348/14.02 |
| 2015/0379670 A1 | 12/2015 | Koker et al. | |
| 2016/0092699 A1 | 3/2016 | Riva et al. | |
| 2016/0274864 A1 | 9/2016 | Zomet et al. | |
| 2016/0308981 A1 | 10/2016 | Cortes Gomez | |
| 2016/0357717 A1 | 12/2016 | Metz et al. | |
| 2017/0068423 A1 | 3/2017 | Napolitano et al. | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0169817 A1 | 6/2017 | Vanblon et al. | |
| 2017/0250936 A1 | 8/2017 | Rosenberg et al. | |
| 2017/0300456 A1 | 10/2017 | Rimmer et al. | |
| 2017/0315962 A1 | 11/2017 | Kovar | |

(56) References Cited

U.S. PATENT DOCUMENTS

| | | |
|---|---|---|
| 2017/0358301 A1 | 12/2017 | Raitio et al. |
| 2018/0190271 A1* | 7/2018 | Bhaya ............... G06F 16/3344 |
| 2018/0191798 A1 | 7/2018 | Zhu et al. |

FOREIGN PATENT DOCUMENTS

| | | |
|---|---|---|
| EP | 1 965 564 | 9/2008 |
| EP | 2 814 244 A1 | 12/2014 |
| JP | 2005-043959 | 2/2005 |
| JP | 2006-146939 A | 6/2006 |
| JP | 2011-066623 | 3/2011 |
| JP | 2012-073863 A | 4/2012 |
| JP | 2014-132464 | 7/2014 |
| JP | 2014-531076 | 11/2014 |
| KR | 2014-0143768 A | 12/2017 |
| WO | WO-2004/084109 A1 | 9/2004 |
| WO | WO-2011/065564 A1 | 6/2011 |
| WO | WO-2011/088053 A2 | 7/2011 |
| WO | WO-2012/002351 A1 | 1/2012 |
| WO | WO-2014/014745 A2 | 1/2014 |
| WO | WO-2015/179510 A1 | 11/2015 |
| WO | WO-2016/054230 A1 | 4/2016 |
| WO | WO-2016/111881 A1 | 7/2016 |

OTHER PUBLICATIONS

Abrams, Help users find, interact & re-engage with your app on the Google Assistant, Google Developers Blog, Nov. 15, 2017 (16 pages).
Albrecht, "Alexa, How Can You Be Used in Restaurants?", the spoon, Dec. 10, 2017 (6 pages).
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Barr, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition Within Messages", May 11, 2017 (11 pages).
Buckland et al., "Amazon's Alexa Takes Open-Source Route to Beat Google Into Cars", Bloomberg, Feb. 27, 2018 (6 pages).
Chen, Yilun Lulu, "Alibaba Challenges Google, Amazon With New Echo-Like Device", Bloomberg, Jul. 5, 2017 (3 pages).
Close, "Amazon Echo Will Give You These Deals If You Order Through Alexa This Weekend," Web Article, Nov. 18, 2016, Time. com (2 pages).
Clover, Juli, "Amazon and Google Want to Turn Their Smart Home Speakers Into Telephone Replacements", MacRumors, Feb. 15, 2017 (5 pages).
CN Offiec Action dated for Appl. Ser. No. 2014005405.8 dated Mar. 5, 2019 (30 pages).
CN Office Action for Appl. Ser. No. 201480054057.8 dated Aug. 30, 2018 (7 pages).
CN Office Action for Appl. Ser. No. 201480054057.8 dated Jan. 17, 2018 (41 pages).
Coberly, "Apple patent filing reveals potential whispering Siri functionality", Techspot, Dec. 14, 2017 (4 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Cook, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017 (3 pages).
European Search Report on EP Ser. No. 14849752, dated Jun. 4, 2017 (8 pages).
Fiegerman, Seth, "Alexa, shut up: Raging Against the New Machines", CNN, Aug. 22, 2017 (6 pages).
Foghorn Labs, "10 Tips to Improve the Performance of Google Product Listing Ads," printed from Internet address: http://www.foghornlabs.com/2012/11/21/product-listing-ads-best-practices/, on Mar. 18, 2013 (5 pages).
Forrest, Conner, "Essential Home wants to be 'bridge' between Amazon Alexa, Apple's Siri, and Google Assistant," TechRepublic, May 31, 2017 (9 pages).
Foxx, Chris, "Apple reveals HomePod smart speaker", BBC, Jun. 5, 2017 (9 pages).
Gebhart, Andrew, "Google Assistant is spreading, but it needs its own 'Echo Dot'", Cnet, May 20, 2017 (6 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers Newsletter "Google Assistant SDK", developers. google.com, retrieved on Jul. 12, 2017 (2 pages).
Google Inc., "Products Feed Specification," printed from Internet address: http://www.support.google.com/merchants/bin/answer.py?hl=en&answer=188494#US, on Mar. 18, 2013 (6 pages).
Google Inc., "Supported File Formats," printed from Internet address: http://www.support.google.com/merchants/bin/answer.py?hl=en&answer=160567, on Mar. 18, 2013 (1 page).
Gurman, Mark and Webb, Alex, "Apple Is Manufacturing a Siri Speaker to Outdo Google and Amazon", Bloomberg, May 31, 2017 (3 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017 (6 pages).
International Patent No. PCT/US2014/057247,International Search Report and Written Opinion dated Dec. 30, 2014 (19 pages).
International Preliminary Report on Patentability for Appl. Ser. No. PCT/US2017/049780 dated Sep. 10, 2018 (7 pages).
International Preliminary Report on Patentability on PCT/US2014/057247 dated Apr. 14, 2016 (10 pages).
International Search Report and Written Opinion for Appl. Ser. No. PCT/US2017/49766 dated Nov. 24, 2017 (11 pages).
International Search Report and Written Opinion for PCT Appl. Ser. No. PCT/US2017/049780 dated Nov. 28, 2017 (11 pages).
Johnson, Khari, "Amazon's Alexa Wants to Learn More About Your Feelings", VentureBeat, Dec. 22, 2017 (4 pages).
Johnston, "Amazon Whirlwind: New Echo, Plus, Spot, Connect, Fire TV Take the Stage", Twice, Sep. 27, 2017 (4 pages).
JP Notice of Allowance for Appl. Ser. No. 2017-556886 dated May 27, 2019 (6 pages).
JP Office Action for Appl. Ser. No. 2016-545216 dated Aug. 13, 2018 (6 pages).
JP Office Action for Appl. Ser. No. 2017-556886 dated Feb. 8, 2019 (8 pages).
JP Office Action for Appl. Ser. No. 2017-556911 dated Feb. 25, 2019 (7 pages).
Kelion, "Amazon revamps Echo smart speaker family", BBC News, Sep. 21, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (3 pages).
Koetsier, John, "This AI Can Recognize Anger, Awe, Desire, Fear, Hate, Grief, Love . . . by How You Touch Your Phone", Consumer Tech, Aug. 31, 2018 (4 pages).
KR Office Action for Appl. Ser. No. 10-2017-7031379 dated Jan. 21, 2019 (7 pages).
KR Office Action for Appl. Ser. No. 10-2017-7031385 dated Feb. 21, 2019 (21 pages).
Krishna, "Jim Beam's smart decanter will pour you a shot when you ask", engadget, Nov. 29, 2017 (3 pages).

(56) References Cited

OTHER PUBLICATIONS

Lacy, "Improving search and advertising are the next frontiers for voice-activated devices", TechCrunch, Dec. 20, 2017 (13 pages).
Lardinois, Frederic, Google Launches New Ad Unit for Responsive Sites, Google AdSense, http://techcrunch.com/2013/07/31/google-launches-new-ad-unit-for-responsive-sites/, Jul. 31, 2013 (3 pages).
Larson, Selena, "Google Home now recognizes your individual voice", CNN Money, San Francisco, California, Apr. 20, 2017 (3 pages).
Lee, Take Two for Samsung's troubled Bixby assistant, BBC News, Oct. 19, 2017 (6 pages).
Lee, Dave, "The five big announcements from Google I/O", BBC, May 18, 2017 (11 pages).
Liberatore, Stacy, "Now Alexa knows when you're angry: Amazon's virtual assistant will analyse emotions in user's voices", DailyMail.com, Jun. 13, 2016 (33 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013 (17 pages).
Medeiros, J. "Virtual Assistants Can Detect Your Bad Mood and Do Something About It", Voice Summit Blog, Dec. 1, 2018 (7 pages).
Nieva, Richard, "Google Home and eBay can tell you how much that's worth", cnet, Mar. 8, 2017 (3 pages).
Non-Final Office Action on U.S. Appl. No. 15/590,861 dated Jul. 25, 2019 (13 pages).
Notice of Allowance on U.S. Appl. No. 15/621,806 dated Aug. 13, 2019 (2 pages).
Notice of Allowance on U.S. Appl. No. 13/222,380 dated Oct. 7, 2013 (9 pages).
Notice of Allowance on U.S. Appl. No. 14/176,845 dated Aug. 6, 2015 (8 pages).
Novet, et al., "Amazon is getting ready to bring Alexa to work", CNBC, Nov. 29, 2017 (4 pages).
Office Action on U.S. Appl. No. 13/222,380 dated Apr. 3, 2013 (21 pages).
Office Action on U.S. Appl. No. 13/222,380 dated Aug. 16, 2013 (5 pages).
Office Action on U.S. Appl. No. 14/176,845 dated Apr. 2, 2015 (8 pages).
Palladino, "Garmin teamed up with Amazon to make a tiny Echo Dot for your car", ars Technica, Oct. 17, 2017 (2 pages).
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
PCT International Preliminary Report on Patentability for Appl. Ser. No. PCT/US2017/049766 dated Mar. 13, 2019 (7 pages).
Perez, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", Tech Crunch, Jun. 15, 2017 (8 pages).
Porter, Jon, "Amazon Echo Show release date, price, news and features", Tech Radar, Jun. 26, 2017 (11 pages).
Pringle, "'I'm sorry to hear that': Why training Siri to be a therapist won't be easy", CBC News, Sep. 24, 2017 (3 pages).
Purcher, Jack, Today Google Home's Virtual Assistant can learn its Owner's voice for Security Reasons like Apple's Patent Pending Idea, Apr. 20, 2017 (4 pages).
Robertson, Katie, "Amazon Bets on an Empathetic Alexa", The New York Times, Mar. 3, 2019 (3 pages).
Sablich, Justin, "Planning a Trip With the Help of Google Home", New York Times, dated May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges At 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017 (2 pages).
Stackoverflow, "Is it possible for a thread to deadlock itself", 2010, Stackoverflow, accessed from: www.stackoverflow.com/questions/3493441/is-it-possible-for-a-thread-to-deadlock-itself (23 pages).
Stackoverflow, "What is deadlock", 2008, Stackoverflow, accessed from: www.stackoverflow.com/questions/34512/what-is-a-deadlock# (17 pages).
Unknown Author, "'Dolphin' attacks fool Amazon, Google voice assistants", BBC News, Sep. 7, 2017 (8 pages).
U.S. Notice of Allowance for U.S. Appl. No. 15/361,668 dated Jun. 14, 2018 (5 pages).
U.S. Notice of Allowance for U.S. Appl. No. 15/361,668 dated May 7, 2018 (5 pages).
U.S. Notice of Allowance for U.S. Appl. No. 15/395,694 dated Dec. 10, 2018 (8 pages).
U.S. Notice of Allowance for U.S. Appl. No. 15/395,694 dated Jun. 18, 2019 (8 pages).
U.S. Notice of Allowance for U.S. Appl. No. 15/395,694 dated Mar. 20, 2019 (8 pages).
U.S. Notice of Allowance for U.S. Appl. No. 15/621,806 dated Jun. 4, 2019 (5 pages).
U.S. Notice of Allowance for U.S. Appl. No. 15/621,806 dated Mar. 21, 2019 (10 pages).
U.S. Notice of Allowance for U.S. Appl. No. 15/361,668 dated Feb. 9, 2018 (7 pages).
U.S. Notice of Allowance on U.S. Appl. No. 14/870,725 dated Sep. 1, 2016 (7 pages).
U.S. Notice of Allowance on U.S. Appl. No. 14/048,921 dated Mar. 13, 2017 (15 pages).
U.S. Office Action for U.S. Appl. No. 15/395,694 dated Aug. 9, 2018 (8 pages).
U.S. Office Action for U.S. Appl. No. 15/395,725 dated Jun. 28, 2019 (27 pages).
U.S. Office Action for U.S. Appl. No. 15/395,725 dated Nov. 16, 2018 (7 pages).
U.S. Office Action for U.S. Appl. No. 15/621,806 dated Sep. 25, 2018 (25 pages).
U.S. Office Action for U.S. Appl. No. 15/638,312 dated May 16, 2019 (6 pages).
U.S. Office Action for U.S. Appl. No. 15/361,668 dated Jan. 4, 2018 (7 pages).
U.S. Office Action on U.S. Appl. No. 15/361,668 dated Aug. 23, 2017 (6 pages).
U.S. Office Action on U.S. Appl. No. 14/048,921 dated Jul. 20, 2016 (21 pages).
U.S. Office Action on U.S. Appl. No. 14/048,921 dated Nov. 25, 2015 (18 pages).
U.S. Office Action on U.S. Appl. No. 14/870,725 dated May 12, 2016 (12 pages).
U.S. Office Action on U.S. Appl. No. 15/361,668 dated Aug. 23, 2017 (5 pages).
U.S. Office Action on U.S. Appl. No. 15/361,668 dated Sep. 22, 2017 (8 pages).
Willens, Max, "For publishers, Amazon Alexa holds promise but not much money (yet)", Digiday, Jul. 6, 2017 (5 pages).
Extended European Search Report for EP 19187924.6 dated Sep. 3, 2019 (6 pages).

(56) References Cited

OTHER PUBLICATIONS

Notice of Allowance for KR 10-2017-7031385 dated Jun. 19, 2019 (3 pages).
Notice of Allowance for U.S. Appl. No. 15/395,725 dated Oct. 18, 2019 (14 pages).
Notice of Allowance on CN Appln. Ser. No. 201480054057.8 dated Aug. 30, 2019 (4 pages).
Notice of Allowance on JP Appln. Ser. No. 2017-556911 dated Jun. 10, 2019 (5 pages).
Notice of Allowance on JP Appln. Ser. No. JP 2016-545216 dated Feb. 4, 2019 (5 pages).
Notice of Allowance on KR Appln. Ser. No. 10-2017-7031379 dated Jul. 31, 2019 (3 pages).
Corrected Notice of Allowability for U.S. Appl. No. 15/621,806 dated Sep. 17, 2019 (2 pages).
Notice of Allowance on U.S. Appl. No. 15/638,312 dated Sep. 17, 2019 (8 pages).
Notice of Allowance for U.S. Appl. No. 15/638,312 dated Jan. 2, 2020 (8 pages).
Final Office Action on U.S. Appl. No. 15/590,861 dated Nov. 22, 2019 (14 pages).

\* cited by examiner

FEEDBACK CONTROLLER FOR DATA TRANSMISSIONS

CROSS-REFERENCES TO RELATED APPLICATIONS

This application claims the benefit of priority under 35 U.S.C. § 120 as a continuation of U.S. patent application Ser. No. 15/395,694, filed Dec. 30, 2016, which is hereby incorporated by reference herein in its entirety.

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

The present disclosure is generally directed to a feedback controller for data transmissions over one or more interfaces or one or more types of computer networks. For example, computing systems may have access to a limited number of interfaces, limited types of interfaces, or there may a limited number of available interfaces at a given time. It can be challenging for a system to efficiently transmit information in response to the currently available interfaces because certain types of interfaces may consume greater computing resources or battery. It can be challenging to efficiently, reliably, and accurately communicate information over disparate computing resources because it is challenging for disparate computing resource to efficiently process, and consistently and accurately parse audio-based instructions in a voice-based computing environment. For example, the disparate computing resources may not have access to the same voice models, or may have access to out of date or unsynchronized voice models that can make it challenging to accurately and consistently parse the audio-based instructions.

Systems and methods of the present disclosure are generally directed to a feedback controller for data transmissions. The data processing system can process the voice-based input using voice models that are trained based on aggregate voice to parse the voice-based instructions and select content items via a real-time content selection process performed by a content selector component. The data processing system can transmit the selected content item to the client computing device to initiate a communication session between the client computing device and a third party provider device associated with the selected content item. The data processing system can monitor or otherwise receive information about the communication session to measure a characteristic of the communication session and generate a quality signal. The data processing system can then adjust or control the content selector component based on the quality signal in order to affect the real-time content selection process. For example, blocking or preventing the content selector component from selecting content item objects associated with low quality communication sessions can reduce wasted resource consumption as compared to allowing or permitting the content item to be selected and establish a communication session. Further, for client devices that are utilize battery power, the feedback monitor component can save battery usage.

At least one aspect is directed to a feedback control system for data transmissions over a computer network. The system can include a data processing system that executes a natural language processor and a content selector component. The system can include a feedback monitor component. The natural language processor component can receive, via an interface of the data processing system, data packets comprising an input audio signal detected by a sensor of a client device. The natural language processor component can parse the input audio signal to identify a request and a trigger keyword corresponding to the request. The data processing system can include a content selector component to receive the trigger keyword identified by the natural language processor and to select, based on the trigger keyword, a content item via a real-time content selection process. The system can include a feedback monitor component. The feedback monitor component can receive data packets carrying auditory signals transmitted between the client device and a conversational application programming interface that established a communication session with the client device responsive to interaction with the content item. The feedback monitor can measure a characteristic of the communication session based on the auditory signals. The feedback monitor component can generate a quality signal based on the measured characteristic. The content selector component can adjust the real-time selection process based on the quality signal.

At least one aspect is directed to a method of transmitting data over a computer network using a feedback control system. The method can be performed, at least in part, by a data processing system executing a natural language processor component and content selector component. The method can be performed at least in part by a feedback monitor component. The method can include the natural language processor component receiving, via an interface of the data processing system, data packets comprising an input audio signal detected by a sensor of a client device. The method can include the data processing system parsing the input audio signal to identify a request and a trigger keyword corresponding to the request. The method can include the content selector component receiving the trigger keyword identified by the natural language processor. The method can include the content selector component selecting, based on the trigger keyword, a content item via a real-time content selection process. The method can include the feedback monitor component receiving data packets carrying auditory signals transmitted between the client device and a conversational application programming interface that established a communication session with the client device responsive to interaction with the content item. The method can include the feedback monitor component measuring a quality of the communication session based on the auditory signals. The method can include the feedback monitor component generating a quality signal based on the measured characteristic. The method can include the feedback monitor component adjusting the real-time selection process based on the quality signal.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of a feedback control systems for data transmissions over a computer network. The various concepts introduced above and discussed in greater detail below may be implemented in any of numerous ways.

The present disclosure is generally directed to a feedback controller for data transmissions over one or more interfaces or one or more types of computer networks. For example, computing systems may have access to a limited number of interfaces, limited types of interfaces, or there may a limited number of available interfaces at a given time. It can be challenging for a system to efficiently transmit information in response to the currently available interfaces because certain types of interfaces may consume greater computing resources or battery. It can be challenging to efficiently, reliably, and accurately communicate information over disparate computing resources because it is challenging for disparate computing resource to efficiently process, and consistently and accurately parse audio-based instructions in a voice-based computing environment. For example, the disparate computing resources may not have access to the same voice models, or may have access to out of date or unsynchronized voice models that can make it challenging to accurately and consistently parse the audio-based instructions.

Systems and methods of the present disclosure are generally directed to a feedback controller for data transmissions. The data processing system can process the voice-based input using voice models that are trained based on aggregate voice to parse the voice-based instructions and select content items via a real-time content selection process performed by a content selector component. The data processing system can transmit the selected content item to the client computing device to initiate a communication session between the client computing device and a third party provider device associated with the selected content item. The data processing system can monitor or otherwise receive information about the communication session to measure a characteristic of the communication session and generate a quality signal. The data processing system can then adjust or control the content selector component based on the quality signal in order to affect the real-time content selection process.

Figure 1:
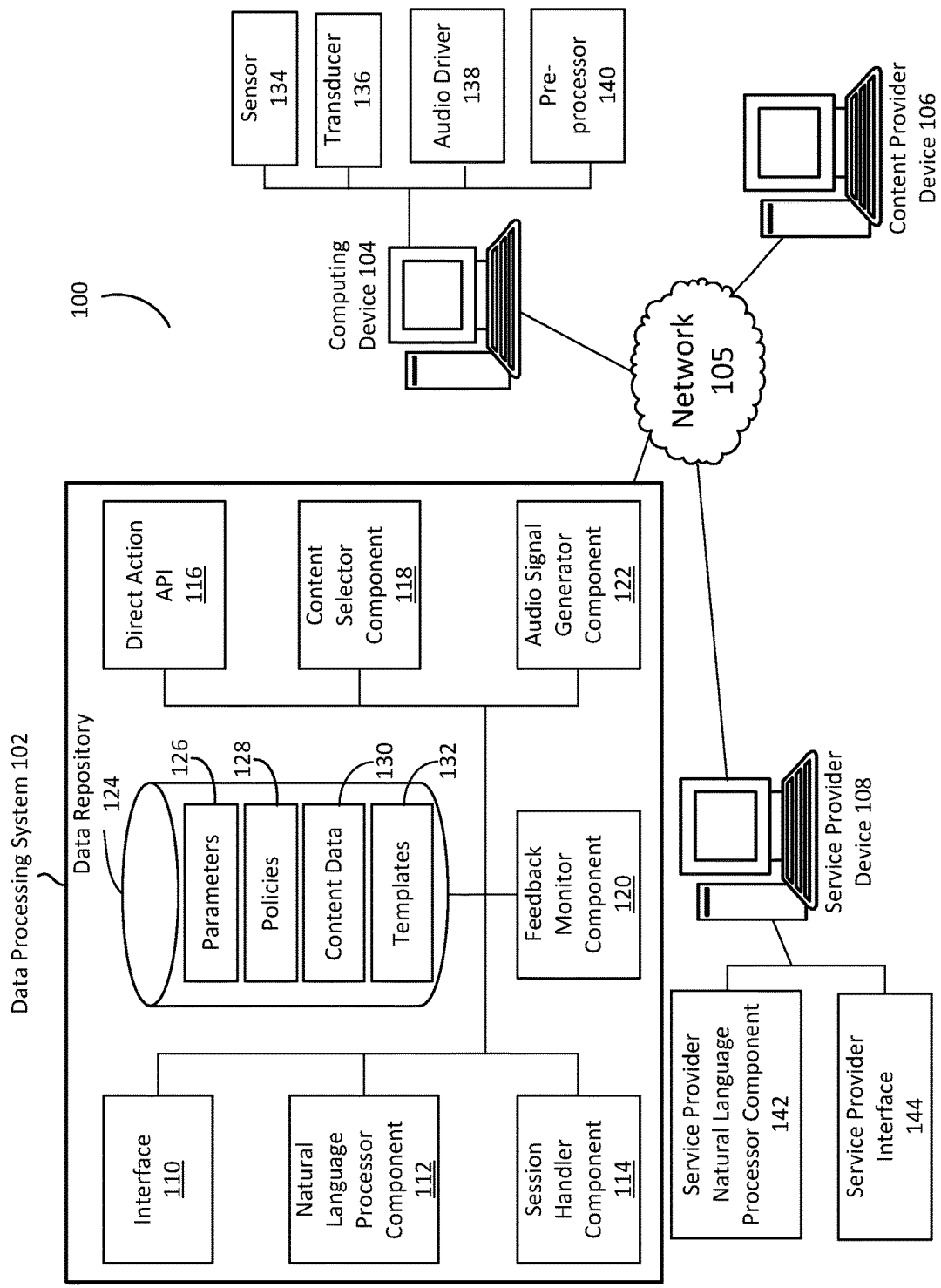
FIG. 1 is an illustration of a feedback control system for data transmissions over a computer network.

FIG. 1 illustrates an example feedback control system 100 for data transmissions over a computer network. The system 100 can include content selection infrastructure. The system 100 can include a data processing system 102. The data processing system 102 can communicate with one or more of a content provider computing device 106, service provider computing device 108, or client computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, personal digital assistant, smart phone, portable computers, or speaker. For example, via the network 105 a user of the computing device 104 can access information or data provided by a service provider 108 or content provider 106.

The network 105 can include or constitute a display network, e.g., a subset of information resources available on the internet that are associated with a content placement or search engine results system, or that are eligible to include third party content items as part of a content item placement campaign. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the content provider computing device 106 or the service provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, the content provider device 106 (content provider 106), or the service provider device 108 (or service provider 108). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one service provider device 108. The service provider device 108 can include at least one logic device such as a computing device having a processor to communicate via the network 105, for example with the computing device 104, the data processing system 102, or the content provider 106. The service provider device 108 can include at least one computation resource, server, processor or memory. For example, service provider device 108 can include a plurality of computation resources or servers located in at least one data center. The service provider device 108 can include one or more component or functionality of the data processing system 102.

The content provider computing device 106 can provide audio based content items for display by the client computing device 104 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 106 can also provide audio based content items (or other content items) to the data processing system 102 where they can be stored in the data repository 124. The data processing system 102 can select the audio content items and provide (or instruct the content provider computing device 104 to provide) the audio content items to the client computing device 104. The audio based content items can be exclusively audio or can be combined with text, image, or video data.

The service provider device 108 can include, interface, or otherwise communicate with at least one service provider natural language processor component 142 and a service provider interface 144. The service provider computing device 108 can include at least one service provider natural language processor (NLP) component 142 and at least one service provider interface 144. The service provider NLP component 142 (or other components such as a direct action API of the service provider computing device 108) can engage with the client computing device 104 (via the data processing system 102 or bypassing the data processing system 102) to create a back-and-forth real-time voice or audio based conversation (e.g., a session) between the client computing device 104 and the service provider computing device 108. The service provider NLP 142 can include one or more function or feature as the NLP component 112 of the data processing system 102. For example, the service provider interface 144 can receive or provide data messages to the direct action API 116 of the data processing system 102. The service provider computing device 108 and the content provider computing device 106 can be associated with the same entity. For example, the content provider computing device 106 can create, store, or make available content items for a car sharing service, and the service provider computing device 108 can establish a session with the client computing device 106 to arrange for a delivery of a taxi or car of the car share service to pick up the end user of the client computing device 104. The data processing system 102, via the direct action API 116, the NLP component 112 or other components can also establish the session with the client computing device, including or bypassing the service provider computing device 104, to arrange for example for a delivery of a taxi or car of the car share service.

The computing device 104 can include, interface, or otherwise communicate with at least one sensor 134, transducer 136, audio driver 138, or pre-processor 140. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can be configured to detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 104 can be associated with an end user that enters voice queries as audio input into the client computing device 104 (via the sensor 134) and receives audio output in the form of a computer generated voice that can be provided from the data processing system 102 (or the content provider computing device 106 or the service provider computing device 108) to the client computing device 104, output from the transducer 136 (e.g., a speaker). The computer generated voice can include recordings from a real person or computer generated language.

The data repository 124 can include one or more local or distributed databases, and can include a database management system. The data repository 124 can include computer data storage or memory and can store one or more parameters 126, one or more policies 128, content data 130, or templates 132 among other data. The parameters 126, policies 128, and templates 132 can include information such as rules about a voice based session between the client computing device 104 and the data processing system 102 (or the service provider computing device 108). The content data 130 can include content items for audio output or associated metadata, as well as input audio messages that can be part of one or more communication sessions with the client computing device 104.

The data processing system 102 can include a content placement system having at least one computation resource or server. The data processing system 102 can include, interface, or otherwise communicate with at least one interface 110. The data processing system 102 can include, interface, or otherwise communicate with at least one natural language processor component 112. The data processing system 102 can include, interface, or otherwise communicate with at least one direct action application programming interface ("API") 116. The data processing system 102 can include, interface, or otherwise communicate with at least one session handler 114. The data processing system 102 can include, interface, or otherwise communicate with at least one content selector component 118. The data processing system 102 can include, interface, or otherwise communicate with at least one feedback monitor component 120. The data processing system 102 can include, interface, or otherwise communicate with at least one audio signal generator 122. The data processing system 102 can include, interface, or otherwise communicate with at least one data repository 124. The at least one data repository 124 can include or store, in one or more data structures or databases, parameters 126, policies 128, content data 130, or templates 132. Parameters 126 can include, for example, thresholds, distances, time intervals, durations, scores, or weights. Content data 130 can include, for example, content campaign information, content groups, content selection criteria, content item objects or other information provided by a content provider 106 or obtained or determined by the data processing system to facilitate content selection. The content data 130 can include, for example, historical performance of a content campaign.

The interface 110, natural language processor component 112, session handler 114, direct action API 116, content selector component 118, feedback monitor component 120, or audio signal generator component 122 can each include at least one processing unit or other logic device such as programmable logic array engine, or module configured to communicate with the database repository or database 124. The interface 110, natural language processor component 112, session handler 114, direct action API 116, content selector component 118, feedback monitor component 120, audio signal generator component 122 and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

A content provider 106 can establish an electronic content campaign. The electronic content campaign can be stored as content data 130 in data repository 124. An electronic content campaign can refer to one or more content groups that correspond to a common theme. A content campaign can include a hierarchical data structure that includes content groups, content item data objects, and content selection criteria. To create a content campaign, content provider 106 can specify values for campaign level parameters of the content campaign. The campaign level parameters can include, for example, a campaign name, a preferred content network for placing content item objects, a value of resources to be used for the content campaign, start and end dates for the content campaign, a duration for the content campaign, a schedule for content item object placements, language, geographical locations, type of computing devices on which to provide content item objects. In some cases, an impression can refer to when a content item object is fetched from its source (e.g., data processing system 102 or content provider 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the content item object for display on the computing device 104. In some cases, an impression can refer to a viewable or audible impression; e.g., the content item object is at least partially (e.g., 20%, 30%, 30%, 40%, 50%, 60%, 70%, or more) viewable on a display device of the client computing device 104, or audible via a speaker 136 of the computing device 104. A click or selection can refer to a user interaction with the content item object, such as a voice response to an audible impression, a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 106 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 106 can use to capture a topic or subject matter for which content item objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 106 can provide one or more keywords and content item objects to each content group. Keywords can include terms that are relevant to the product or services of associated with or identified by the content item objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select content item objects.

The content provider 106 can provide one or more keywords to be used by the data processing system 102 to select a content item object provided by the content provider 106. The content provider 106 can identify one or more keywords to bid on, and further provide bid amounts for various keywords. The content provider 106 can provide additional content selection criteria to be used by the data processing system 102 to select content item objects. Multiple content providers 106 can bid on the same or different keywords, and the data processing system 102 can run a content selection process or ad auction responsive to receiving an indication of a keyword of an electronic message.

The content provider 106 can provide one or more content item objects for selection by the data processing system 102. The data processing system 102 (e.g., via content selector component 118) can select the content item objects when a content placement opportunity becomes available that matches the resource allocation, content schedule, maximum bids, keywords, and other selection criteria specified for the content group. Different types of content item objects can be included in a content group, such as a voice content item, audio content item, a text content item, an image content item, video content item, multimedia content item, or content item link. Upon selecting a content item, the data processing system 102 can transmit the content item object for rendering on a computing device 104 or display device of the computing device 104. Rendering can include displaying the content item on a display device, or playing the content item via a speaker of the computing device 104. The data processing system 102 can provide instructions to a computing device 104 to render the content item object. The data processing system 102 can instruct the computing device 104, or an audio driver 138 of the computing device 104, to generate audio signals or acoustic waves.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script or program installed at the client computing device 104, such as an app to communicate input audio signals to the interface 110 of the data processing system 102 and to drive components of the client computing device to render output audio signals. The data processing system 102 can receive data packets or other signal that includes or identifies an audio input signal. For example, the data processing system 102 can execute or run the NLP component 112 to receive or obtain the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve.

The audio input signal can be detected by the sensor 134 or transducer 136 (e.g., a microphone) of the client computing device 104. Via the transducer 136, the audio driver 138, or other components the client computing device 104 can provide the audio input signal to the data processing system 102 (e.g., via the network 105) where it can be received (e.g., by the interface 110) and provided to the NLP component 112 or stored in the data repository 124.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 112 can apply a semantic processing technique, or other natural language processing technique, to the data packets comprising the sentence to identify trigger phrases "do my laundry" and "do my dry cleaning". The NLP component 112 can further identify multiple trigger keywords, such as laundry, and dry cleaning. For example, the NLP component 112 can determine that the trigger phrase includes the trigger keyword and a second trigger keyword.

The NLP component 112 can filter the input audio signal to identify the trigger keyword. For example, the data packets carrying the input audio signal can include "It would be great if I could get someone that could help me go to the airport", in which case the NLP component 112 can filter out one or more terms as follows: "it", "would", "be", "great", "if", "I", "could", "get", "someone", "that", "could", or "help". By filtering out these terms, the NLP component 112 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 112 can determine this is a request for a laundry service and a dry cleaning service. The NLP component 112 can determine this is a single request for a service provider that can provide both laundry services and dry cleaning services. The NLP component 112 can determine that this is two requests; a first request for a service provider that performs laundry services, and a second request for a service provider that provides dry cleaning services. In some cases, the NLP component 112 can combine the multiple determined requests into a single request, and transmit the single request to a service provider device 108. In some cases, the NLP component 112 can transmit the individual requests to respective service provider devices 108, or separately transmit both requests to the same service provider device 108.

The data processing system 102 can include a direct action API 116 designed and constructed to generate, based on the trigger keyword, an action data structure responsive to the request. Processors of the data processing system 102 can invoke the direct action API 116 to execute scripts that generate a data structure to a service provider device 108 to request or order a service or product, such as a car from a car share service. The direct action API 116 can obtain data from the data repository 124, as well as data received with end user consent from the client computing device 104 to determine location, time, user accounts, logistical or other information to allow the service provider device 108 to perform an operation, such as reserve a car from the car share service. Using the direct action API 116, the data processing system 102 can also communicate with the service provider device 108 to complete the conversion by in this example making the car share pick up reservation.

The direct action API 116 can execute a specified action to satisfy the end user's intention, as determined by the data processing system 102. Depending on the action specified in its inputs, the direct action API 116 can execute code or a dialog script that identifies the parameters required to fulfill a user request. Such code can look-up additional information, e.g., in the data repository 124, such as the name of a home automation service, or it can provide audio output for rendering at the client computing device 104 to ask the end user questions such as the intended destination of a requested taxi. The direct action API 116 can determine necessary parameters and can package the information into an action data structure, which can then be sent to another component such as the content selector component 118 or to the service provider computing device 108 to be fulfilled.

The direct action API 116 can receive an instruction or command from the NLP component 112, or other component of the data processing system 102, to generate or construct the action data structure. The direct action API 116 can determine a type of action in order to select a template from the template repository 132 stored in the data repository 124. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The direct action API 116, upon identifying the type of request, can access the corresponding template from the template repository 132. Templates can include fields in a structured data set that can be populated by the direct action API 116 to further the operation that is requested of the service provider device 108 (such as the operation of sending a taxi to pick up an end user at a pickup location and transport the end user to a destination location). The direct action API 116 can perform a lookup in the template repository 132 to select the template that matches one or more characteristic of the trigger keyword and request. For example, if the request corresponds to a request for a car or ride to a destination, the data processing system 102 can select a car sharing service template. The car sharing service template can include one or more of the following fields: device identifier, pick up location, destination location, number of passengers, or type of service. The direct action API 116 can populate the fields with values. To populate the fields with values, the direct action API 116 can ping, poll or otherwise obtain information from one or more sensors 134 of the computing device 104 or a user interface of the device 104. For example, the direct action API 116 can detect the source location using a location sensor, such as a GPS sensor. The direct action API 116 can obtain further information by submitting a survey, prompt, or query to the end of user of the computing device 104. The direct action API can submit the survey, prompt, or query via interface 110 of the data processing system 102 and a user interface of the computing device 104 (e.g., audio interface, voice-based user interface, display, or touch screen). Thus, the direct action API 116 can select a template for the action data structure based on the trigger keyword or the request, populate one or more fields in the template with information detected by one or more sensors 134 or obtained via a user interface, and generate, create or otherwise construct the action data structure to facilitate performance of an operation by the service provider device 108.

The data processing system 102 can select the template based from the template data structure 132 based on various factors including, for example, one or more of the trigger keyword, request, third party provider device 108, type of third party provider device 108, a category that the third party provider device 108 falls in (e.g., taxi service, laundry service, flower service, or food delivery), location, or other sensor information.

To select the template based on the trigger keyword, the data processing system 102 (e.g., via direct action API 116) can perform a look-up or other query operation on the template database 132 using the trigger keyword to identify a template data structure that maps or otherwise corresponds to the trigger keyword. For example, each template in the template database 132 can be associated with one or more trigger keywords to indicate that the template is configured to generate an action data structure responsive to the trigger keyword that the third party provider device 108 can process to establish a communication session.

In some cases, the data processing system 102 can identify a third party provider device 108 based on the trigger keyword. To identify the third party provide 108 based on the trigger keyword, the data processing system 102 can perform a lookup in the data repository 124 to identify a third party provider device 108 that maps to the trigger keyword. For example, if the trigger keyword includes "ride" or "to go to", then the data processing system 102 (e.g., via direct action API 116) can identify the third party provider device 108 as corresponding to Taxi Service Company A. The data processing system 102 can select the template from the template database 132 using the identify third party provider device 108. For example, the template database 132 can include a mapping or correlation between third party provider devices 108 or entities to templates configured to generate an action data structure responsive to the trigger keyword that the third party provider device 108 can process to establish a communication session. In some cases, the template can be customized for the third party provider device 108 or for a category of third party provider devices 108. The data processing system 102 can generate the action data structure based on the template for the third party provider 108.

To construct or generate the action data structure, the data processing system 102 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by performing a look-up or other query operation on the data repository 124.

In some cases, the data processing system 102 can determine that the information or values for the fields are absent from the data repository 124. The data processing system 102 can determine that the information or values stored in the data repository 124 are out-of-date, stale, or otherwise not suitable for the purpose of constructing the action data structure responsive to the trigger keyword and request identified by the NLP component 112 (e.g., the location of the client computing device 104 may be the old location and not be the current location; an account can be expired; the destination restaurant may have moved to a new location; physical activity information; or mode of transportation).

If the data processing system 102 determines that it does not currently have access, in memory of the data processing system 102, to the values or information for the field of the template, the data processing system 102 can acquire the values or information. The data processing system 102 can acquire or obtain the information by querying or polling one or more available sensors of the client computing device 104, prompting the end user of the client computing device 104 for the information, or accessing an online web-based resource using an HTTP protocol. For example, the data processing system 102 can determine that it does not have the current location of the client computing device 104, which may be a needed field of the template. The data processing system 102 can query the client computing device 104 for the location information. The data processing system 102 can request the client computing device 104 to provide the location information using one or more location sensors 134, such as a Global Positioning System sensor, WIFI triangulation, cell tower triangulation, Bluetooth beacons, IP address, or other location sensing technique.

The direct action API 116 can transmit the action data structure to a third party provider device (e.g., service provider device 108) to cause the third party provider device 108 to invoke a conversational application programming interface (e.g., service provider NLP component 142) and establish a communication session between the third party provider device 108 and the client computing device 104. Responsive to establishing the communication session between the service provider device 108 and the client computing device 1004, the service provider device 108 can transmit data packets directly to the client computing device 104 via network 105. In some cases, the service provider device 108 can transmit data packets to the client computing device 104 via data processing system 102 and network 105.

In some cases, the third party provider device 108 can execute at least a portion of the conversational API 142. For example, the third party provider device 108 can handle certain aspects of the communication session or types of queries. The third party provider device 108 may leverage the NLP component 112 executed by the data processing system 102 to facilitate processing the audio signals associated with the communication session and generating responses to queries. In some cases, the data processing system 102 can include the conversational API 142 configured for the third party provider 108. In some cases, the data processing system routes data packets between the client computing device and the third party provider device to establish the communication session. The data processing system 102 can receive, from the third party provider device 108, an indication that the third party provider device established the communication session with the client device 104. The indication can include an identifier of the client computing device 104, timestamp corresponding to when the communication session was established, or other information associated with the communication session, such as the action data structure associated with the communication session. In some cases, the data processing system 102 can include a session handler component 114 to manage the communication session and a feedback monitor component 120 to measure the characteristic of the communication session.

The data processing system 102 can include, execute, access, or otherwise communicate with a session handler component 114 to establish a communication session between the client device 104 and the data processing system 102. The communication session can refer to one or more data transmissions between the client device 104 and the data processing system 102 that includes the input audio signal that is detected by a sensor 134 of the client device 104, and the output signal transmitted by the data processing system 102 to the client device 104. The data processing system 102 (e.g., via the session handler component 114) can establish the communication session responsive to receiving the input audio signal. The data processing system 102 can set a duration for the communication session. The data processing system 102 can set a timer or a counter for the duration set for the communication session. Responsive to expiration of the timer, the data processing system 102 can terminate the communication session.

The communication session can refer to a network-based communication session in which the client device 104 provides authenticating information or credentials to establish the session. In some cases, the communication session refers to a topic or a context of audio signals carried by data packets during the session. For example, a first communication session can refer to audio signals transmitted between the client device 104 and the data processing system 102 that are related to (e.g., include keywords, action data structures, or content item objects) a taxi service; and a second communication session can refer to audio signals transmitted between the client device 104 and data processing system 102 that are related to a laundry and dry cleaning service. In this example, the data processing system 102 can determine that the context of the audio signals are different (e.g., via the NLP component 112), and separate the two sets of audio signals into different communication sessions. The session handler 114 can terminate the first session related to the ride service responsive to identifying one or more audio signals related to the dry cleaning and laundry service. Thus, the data processing system 102 can initiate or establish the second session for the audio signals related to the dry cleaning and laundry service responsive to detecting the context of the audio signals.

The data processing system 102 can include, execute, or otherwise communicate with a content selector component 118 to receive the trigger keyword identified by the natural language processor and select, based on the trigger keyword, a content item via a real-time content selection process. In some cases, the direct action API 116 can transmit the action data structure to the content selector component 118 to perform the real-time content selection process and establish a communication session between the content provider device 106 (or a third party provider device 108) and the client computing device 104.

The content selection process can refer to, or include, selecting sponsored content item objects provided by third party content providers 106. The content selection process can include a service in which content items provided by multiple content providers are parsed, processed, weighted, or matched in order to select one or more content items to provide to the computing device 104. The content selection process can be performed in real-time or offline. Performing the content selection process in real-time can refer to performing the content selection process responsive to the request for content received via the client computing device 104. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 104, or within a time interval after the communication session is terminated.

For example, the data processing system 102 can include a content selector component 118 designed, constructed, configured or operational to select content item objects. To select content items for display in a voice-based environment, the data processing system 102 (e.g., via NLP component 112) can parse the input audio signal to identify keywords (e.g., a trigger keyword), and use the keywords to select a matching content item based on a broad match, exact match, or phrase match. For example, the content selector component 118 can analyze, parse, or otherwise process subject matter of candidate content items to determine whether the subject matter of the candidate content items correspond to the subject matter of the keywords or phrases of the input audio signal detected by the microphone of the client computing device 104. The content selector component 118 may identify, analyze, or recognize voice, audio, terms, characters, text, symbols, or images of the candidate content items using an image processing technique, character recognition technique, natural language processing technique, or database lookup. The candidate content items may include metadata indicative of the subject matter of the candidate content items, in which case the content selector component 118 may process the metadata to determine whether the subject matter of the candidate content item corresponds to the input audio signal.

Content providers 106 may provide additional indicators when setting up a content campaign that includes content items. The content provider 106 may provide information at the content campaign or content group level that the content selector component 118 may identify by performing a lookup using information about the candidate content item. For example, the candidate content item may include a unique identifier, which may map to a content group, content campaign, or content provider. The content selector component 118 may determine, based on information stored in content campaign data structure in data repository 124, information about the content provider 106.

The data processing system 102 can receive, via a computer network, a request for content for presentation on a computing device 104. The data processing system 102 can identify the request by processing an input audio signal detected by a microphone of the client computing device 104. The request can include selection criteria of the request, such as the device type, location, and a keyword associated with the request. The request can include the action data structure or action data structure.

Responsive to the request, the data processing system 102 can select a content item object from data repository 124 or a database associated with the content provider 106, and provide the content item for presentation via the computing device 104 via network 105. The content item object can be provided by a content provider device 108 different from the service provider device 108. The content item can correspond to a type of service different from a type of service of the action data structure (e.g., taxi service versus food delivery service). The computing device 104 can interact with the content item object. The computing device 104 can receive an audio response to the content item. The computing device 104 can receive an indication to select a hyperlink or other button associated with the content item object that causes or allows the computing device 104 to identify service provider 108, request a service from the service provider 108, instruct the service provider 108 to perform a service, transmit information to the service provider 108, or otherwise query the service provider device 108.

The data processing system 102 can include, execute, or communicate with an audio signal generator component 122 to generate an output signal. The output signal can include one or more portions. For example, the output signal can include a first portion and a second portion. The first portion of the output signal can correspond to the action data structure. The second portion of the output signal can correspond to the content item selected by the content selector component 118 during the real-time content selection process.

The audio signal generator component 122 can generate the output signal with a first portion having sound corresponding to the first data structure. For example, the audio signal generator component 122 can generate the first portion of the output signal based on one or more values populated into the fields of the action data structure by the direct action API 116. In a taxi service example, the values for the fields can include, for example, 123 Main Street for pick-up location, 1234 Main Street for destination location, 2 for number of passengers, and economy for the level of service. The audio signal generator component 122 can generate the first portion of the output signal in order to confirm that the end user of the computing device 104 wants to proceed with transmitting the request to the service provider 108. The first portion can include the following output "Would you like to order an economy car from taxi service provider A to pick two people up at 123 Main Street and drop off at 1234 Main Street?"

In some cases, the first portion can include information received from the service provider device 108. The information received from service provider device 108 can be customized or tailored for the action data structure. For example, the data processing system 102 (e.g., via direct action API 116) can transmit the action data structure to the service provider 108 before instructing the service provider 108 to perform the operation. Instead, the data processing system 102 can instruct the service provider device 108 to perform initial or preliminary processing on the action data structure to generate preliminary information about the operation. In the example of the taxi service, the preliminary processing on the action data structure can include identifying available taxis that meet the level of service requirement that are located around the pick-up location, estimating an amount of time for the nearest available taxi to reach the pick-up location, estimating a time of arrival at the destination, and estimating a price for the taxi service. The estimated preliminary values may include a fixed value, an estimate that is subject to change based on various conditions, or a range of values. The service provider device 108 can return the preliminary information to the data processing system 102 or directly to the client computing device 104 via the network 104. The data processing system 102 can incorporate the preliminary results from the service provider device 108 into the output signal, and transmit the output signal to the computing device 104. The output signal can include, for example, "Taxi Service Company A can pick you up at 123 Main Street in 10 minutes, and drop you off at 1234 Main Street by 9 AM for $10. Do you want to order this ride?" This can form the first portion of the output signal.

In some cases, the data processing system 102 can form a second portion of the output signal. The second portion of the output signal can include a content item selected by the content selector component 118 during a real-time content selection process. The first portion can be different from the second portion. For example, the first portion can include information corresponding to the action data structure that is directly responsive to the data packets carrying the input audio signal detected by the sensor 134 of the client computing device 104, whereas the second portion can include a content item selected by a content selector component 104 that can be tangentially relevant to the action data structure, or include sponsored content provided by a content provider device 106. For example, the end user of the computing device 104 can request a taxi from Taxi Service Company A. The data processing system 102 can generate the first portion of the output signal to include information about the taxi from the Taxi Service Company A. However, the data processing system 102 can generate the second portion of the output signal to include a content item selected based on the keywords "taxi service" and information contained in the action data structure that the end user may be interested in. For example, the second portion can include a content item or information provided by a different taxi service company, such as Taxi Service Company B. While the user may not have specifically requested Taxi Service Company B, the data processing system 102 may nonetheless provide a content item from Taxi Service Company B because the user may choose to perform an operation with Taxi Service Company B.

The data processing system 102 can transmit information from the action data structure to the Taxi Service Company B to determine a pick-up time, time of arrival at the destination, and a price for the ride. The data processing system 102 can receive this information and generate the second portion of the output signal as follows: "Taxi Service Company B can pick you up at 123 Main Street in 2 minutes, and drop you off at 1234 Main Street by 8:52 AM for $15. Do you want this ride instead?" The end user of computing device 104 can then select the ride provided by Taxi Service Company A or the ride provided by Taxi Service Company B.

Prior to providing, in the second portion of the output signal, the sponsored content item corresponding to the service provided by Taxi Service Company B, the data processing system 102 can notify the end user computing device that the second portion corresponds to a content item object selected during a real-time content selection process (e.g., by the content selector component 118). However, the data processing system 102 can have limited access to different types of interfaces to provide the notification to the end user of the computing device 104. For example, the computing device 104 may not include a display device, or the display device may be disabled or turned off. The display device of the computing device 104 may consume greater resources than the speaker of the computing device 104, so it may be less efficient to turn on the display device of the computing device 104 as compared to using the speaker of the computing device 104 to convey the notification. Thus, in some cases, the data processing system 102 can improve the efficiency and effectiveness of information transmission over one or more interfaces or one or more types of computer networks. For example, the data processing system 102 (e.g., via the audio signal generator component 122) can module the portion of the output audio signal comprising the content item to provide the indication or notification the end user that that portion of the output signal comprises the sponsored content item.

The data processing system 102 (e.g., via interface 110 and network 105) can transmit data packets comprising the output signal generated by the audio signal generator component 122. The output signal can cause the audio driver component 138 of or executed by the client device 104 to drive a speaker (e.g., transducer 136) of the client device 104 to generate an acoustic wave corresponding to the output signal.

The data processing system 102 can include a feedback monitor component 120. The feedback monitor component 120 can include hardware or software to measure the characteristic of the communication session. The feedback monitor component 120 can receive data packets carrying auditory signals transmitted between the client device (e.g., computing device 104) and a conversational application programming interface (e.g., NLP component 112 executed by the data processing system or the service provider NLP component 142 executed by the service provider device 108, a third party provider device, or the content provider device 106) that established a communication session with the client device responsive to interaction with the content item. In some cases, the content provider device 106 can execute an NLP component comprising one or more functions or components of the service provider NLP component 142 or the NLP component 112. The NLP component executed by the service provider device 108 or the content provider device 106 can be customized for the service provider device 108 or the content provider device 106. By customizing the NLP component, the NLP component can reduce bandwidth usage and request-responses as compared to a generic or standard NLP component because the NLP component can be configured with more precise queries and responses that result in reduced back-and-forth between the NLP component and the client computing device 104.

The feedback monitor component 120 can measure a characteristic of the communication session based on the auditory signals. The feedback monitor component 120 can generate a quality signal based on the measured characteristic. The quality signal can include or refer to a quality level, quality metric, quality score or quality level. The quality signal can include, for example, a numeric score (e.g., 0 to 10 with 0 being lowest quality and 10 being highest quality, or vice versa), a letter grade (e.g., A to F with A being the best quality), a binary value (e.g., Yes/No; Good/Bad; I/O; high/low), rank, or percentile. The quality signal can include an average quality signal determined from communications between a plurality of client devices that communicate with a same NLP component or provider device 106 or 108.

The feedback monitor component 120 can measure the characteristic of the communication session using various measuring techniques, heuristic techniques, policies, conditions, or tests. The feedback monitor component 120 can parse data packets transmitted between the client device 104 and the content provider device, third party device, service provider or data processing system to determine a characteristic of the communication session. The quality can refer to the quality of the communication channel used to transmit the data or the quality of the data being communicated. For example, the quality of the communication channel can refer to a signal-to-noise ratio, ambient noise level, delay, lag, latency, choppiness, an echo, or dropped calls. The quality of the data being communicated can refer to the quality of the responses generated by the NLP component that is responding to audio signals detected by the microphone of the computing device. The quality of the data can be based on the responsiveness of the NLP component, accuracy of the NLP component, or latency between the NLP component receiving the audio signal or query from the client device 104 and transmitting a response.

The feedback monitor component 120 can determine the quality of the communication channel by measuring the amount of background noise and the signal level to determine the signal-to-noise ("SNR") ratio. The feedback monitor component 120 can compare the measured or determined SNR to a threshold to determine the quality level. For example, a 10 dB SNR may be considered good. The thresholds can be predetermined or determined via a machine learning model (e.g., based on feedback from a plurality of devices).

The feedback monitor component 120 can further determine the quality of the communication channel based on the ping time between the client device 104 and the provider device or data processing system. The data processing system can compare the ping time with a threshold to determine the quality level. For example, the ping threshold can be 20 ms, 30 ms, 50 ms, 100 ms, 200 ms or more. The feedback monitor component 120 can determine the quality of the communication channel based on choppiness of the audio (e.g., pauses or breaks in the audio; the audio cutting out). The feedback monitor component 120 can identify an echo in the communication channel to determine a low quality level. The feedback monitor component 120 can determine the number of dropped call for the NLP component during a time interval or a ratio of dropped call to total calls, and compare that with a threshold to determine the quality level. For example, the threshold can be 2 dropped calls per hour; or 1 dropped call for every 100 calls.

The feedback monitor component 120 can determine the quality of the communication session based on the quality of the responses generated by the NLP component (or conversational API) that is communicating with the client computing device 104. The quality of the responses can include or be based on, for example, the amount of time the NLP component takes to generate a response, the text of the response, the accuracy of the response, the relevancy of the response, a semantic analysis of the response, or a network activity of the client device in response to the response provided by the NLP component. The feedback monitor component 120 can determine the amount of time the NLP component takes to generate the response by differencing a timestamp corresponding to when the NLP component receives the audio signals from the client device 104, and a timestamp corresponding to when the NLP transmits the response. The feedback monitor component 120 can determine the amount of time by differencing a time stamp corresponding to when the client device transmits the audio signals and a time stamp corresponding to when the client device receives the response from the NLP component.

The feedback monitor component 120 can determine the quality of the response by parsing data packets comprising the response. For example, the feedback monitor component 120 can parse and analyze the text of the response, the accuracy of the response, or the relevancy of the response to the query from the client device. The feedback monitor component 120 can perform this assessment by providing the query to another NLP component and compare the responses from the two NLP components. The feedback monitor component 120 can perform this assessment by providing the query and response to a third party assessor. The feedback monitor component 120 can determine the consistency of the response by comparing a plurality of responses to a plurality of similar queries provided by a plurality of client devices. The feedback monitor component 120 can determine the quality of the response based on the number of times the client device transmits audio signals comprising the same query (e.g., indicating that the responses have not been fully responsive to the query submitted by the client device).

The feedback monitor component 120 can determine the quality of the response generated by the NLP based on network activity of the client device. For example, the NLP component can receive a voice query from the client device, generate a response to the voice query, and transmit data packets carrying the response to the client device. The client device, upon receiving the response from the NLP component, can perform a network activity or change a network activity. For example, the client device can terminate the communication session, which can indicate that the NLP component was fully responsive to the client device, or the NLP failed to successfully respond to the client device and the client device gave up on the NLP component. The feedback monitor component can determine that the client device terminated the call for good or bad reasons based on a confidence score associated with the response generated by the NLP component. The confidence score can be associated with a probabilistic or statistical semantic analysis used to generate the response.

The feedback monitor component 120 can determine that the client device terminated the communication session based on an absence of audio signals transmitted by the client device. The feedback monitor component 120 can determine that the client device terminated the communication session based on a terminate or end command transmitted by the client device. The feedback monitor component 120 can determine a quality level based on an amount of silence from the client device (e.g., absence of audio signals). The absence of audio signals can be identified based on the SNR from the client device being less than a threshold (e.g., 6 dB, 3 dB, or 0 dB). The feedback monitor component can measure the characteristic based on a duration of the communication session. For example, a duration greater than a threshold can indicate that the end user of the client device was satisfied with the communication session. However, a long duration combined with other characteristics such as an increased amplitude of audio signals, repeated queries, and decreased tempo may indicate a low quality since the user of the client may have spent an unnecessary or unwanted extended amount of time engaged with the communication session.

The NLP component can perform a semantic analysis on the queries transmitted by the client device to determine that the client device repeatedly transmits the same or similar queries even though the NLP component is generated and providing responses. The feedback monitor component 120 can determine, based on the number of repeat queries within a time interval (or sequentially repeated queries) exceeding a threshold (e.g., 2, 3, 4, 5, 6, 7 or more), that the quality level is low.

In some cases, the feedback monitor component 120 can determine the quality of the communication session at different parts of the communication session (e.g., beginning, middle, or end; or time intervals). The for example, the feedback monitor component 120 can determine the quality of a first portion or first time interval of the communication session; and the quality of a second portion or second time interval in the communication session that is subsequent to the first portion or first time interval. The feedback monitor component 120 can compare the quality at the two portions to determine a quality of the overall communication session. For example, a difference in quality between the two portions that is greater than a threshold can indicate a low quality, inconsistent quality, or unreliable quality.

In some cases, the feedback monitor component 120 can determine the quality based on a characteristic of the communication session or at least a portion thereof. The characteristic can include, for example, at least one of amplitude, frequency, tempo, tone, and pitch. For example, the feedback monitor component 120 can use the characteristic to determine a reaction of the user of the client device or sentiment of the use of the client. For example, if the amplitude of the audio signals transmitted by the client device increases after each response from the NLP, the feedback monitor can determine that the end user is frustrated with the NLP component generated responses. The feedback monitor component 120 can compare the amplitude of the audio signals detected by the client device with a threshold or with other audio signals received by the client device during the same communication session or different communication sessions.

The feedback monitor component 120 can determine the quality based on a characteristic such as the tempo or pitch of the audio signals detected by the client device and transmitted to the NLP component. The feedback monitor component 120 can determine, for example, that a slowing down of the tempo (e.g., rate of words spoken per time interval) after each NLP response can indicate that the end user is not satisfied with the response generated by the NLP component and is repeating it slower to allow the NLP component to better parse the audio signals and improve the response. In some cases, an increase or steady tempo can indicate that the use of the client device is satisfied with the responses generated by the NLP and has confidence in the responses. In some cases, an increase in the pitch of the audio signals detected by the client device can indicate a poor quality of responses from the NLP or lack of confidence in the responses.

In some cases, the feedback monitor component 120 can transmit queries to the client device to measure or determine the quality. For example, the feedback monitor component 120 can transmit survey questions to the end user asking about the quality of the communication session, NLP component, or provider device. In some cases, the feedback monitor component 120 can generate the query responsive to the feedback monitor component 120 determining that a first quality signal is below a threshold. For example, the feedback monitor component 120 can determine a first quality signal based on measuring the quality using characteristics such as the increase in amplitude of the audio signals detected by the client device in combination with the decrease in tempo of the audio signals detected by the client device. The feedback monitor component 120 can generate a quality signal indicating a low level of quality based on the combined characteristics of amplitude and tempo. Responsive to the low quality signals determined based on the combination characteristic, the feedback monitor component 120 can generate and transmit a query to the client device that either implicitly or explicitly enquires about the quality of the communication session (e.g., How satisfied are you with the responses generated by the NLP component?; How satisfied are you with the communication session?). In another example, the data processing system can determine a quality based on whether the service provider 108 can provide the requested service. For example, the end user may request a product or service, but the service provider 108 responds stating that they do not have that product or cannot perform that service, which can cause the end user to indicate frustration with the service provider 108. The data processing system 102 can identify this frustration, and assign a quality accordingly.

In some cases, the feedback monitor component 120 can measure the characteristic based on network activity on multiple electronic surfaces, and aggregate the quality measured from the multiple electronic surfaces to generate a summed quality signal. The summed quality signal can be an average, weighted average, absolute sum, or other combined quality signal value. The feedback monitor component 120 can further generate statistics for the combined quality signal value or perform a statistical analysis, such as determine the standard deviation, variance, 3 sigma quality, or 6 sigma qualities.

The feedback monitor component 120 can adjust the real-time content selection process performed by the content selector component 118. Adjusting the real-time content selection process can refer to adjusting a weight used to select the content item provided by the content provider device 106 or service provider device 108 or third party provider device 108 that executed the NLP component used to establish the communication session with the client device 104. For example, if the content item led to a low quality communication session, the feedback monitor component 120 can adjust an attribute or parameter of the content data 130 comprising the content item to reduce the likelihood of that content item being selected for similar action data structures or similar client devices 104 (or accounts or profiles thereof).

In some cases, the feedback monitor component 120 can prevent or block the content selector component 118 from selection, in the real-time selection process, of the content item responsive to the quality signal less than a threshold. In some cases, the feedback monitor component 120 can allow or permit the content selector component 118 to select, in the real-time selection process, the content item responsive to the quality signal greater than or equal to a threshold.

Figure 2:
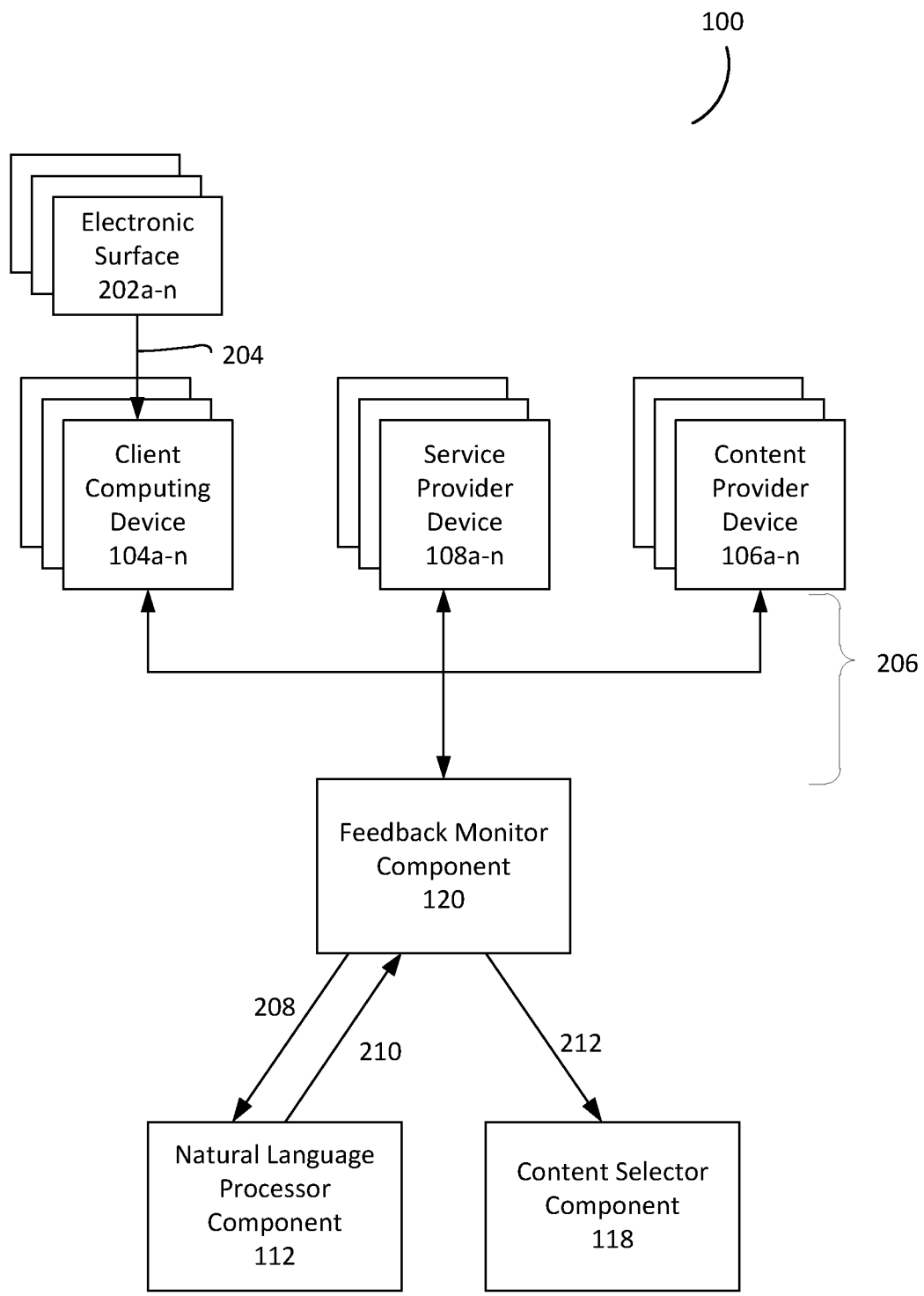
FIG. 2 is an illustration of an operation of a feedback control system for data transmissions over a computer network.

FIG. 2 is an illustration of an operation of a feedback control system for data transmissions over a computer network. The system can include one or more component of system 100 depicted in FIG. 1. The system 100 can include one or more electronic surfaces 202a-n that are executed or provided by one or more client computing devices 104a-n. Examples of electronic surfaces 202a-n can include audio interfaces, voice-based interfaces, display screen, HTML content items, multimedia, images, video, text-based content items, SMS, messaging application, chat application, or natural language processors.

At ACT 204, the client computing device 104 can receive data packets, signals or other information indicative of a feedback from or via an electronic surface 202. At ACT 206, the one or more client computing devices 104a-n, one or more service provider devices 108a-n, or the one or more content provider devices 106a-n can transmit data packets to the feedback monitor component 124. The data packets can be associated with the communication session established between the client device 104 and one or more of the service provider device 108 or the content provider device 106. The data packets can be transmitted from a respective device to the feedback monitor component 124.

In some cases, the feedback monitor component 124 may intercept data packets transmitted from a device 104, 106 or 108 to a respective device. The feedback monitor component 124 can analyze the intercepted data packet and route or forward the data packet to its intended destination. Thus, the feedback monitor component 124 can be intermediary to the client device 104 and the service/third party provider device 108 or the content provider device 106.

At ACT 208, the feedback monitor component 124 can transmit the intercepted or received data packets from the communication session to the NLP component 112. At ACT 210, the NLP component 112 can perform a semantic analysis of the data packets and provide them back to the feedback component 124. In some cases, the NLP component 112 can perform natural language processing on the audio signals from the communication session 206 to compare the NLP component's responses generated by the provider devices 106 or 108. The feedback monitor component 124 can compare the responses generated by a control NLP component 112 to determine whether the third party NLP components are functioning on a comparable or satisfactory level.

At ACT 212, the feedback monitor component 124 can determine a quality signal for the communication session 206, and adjust the real-time content selection process performed by the content selector component 118 such that the next time the content selector component 118 receives a request for content, the content selector component 118 can appropriately weight the content item (or content provider) associated with the communication session 206 to either increase or decrease the likelihood of the content item being selected. For example, if provider 108 is associated with a plurality of low quality communication session, the feedback monitor component 124 can instruct the content selector component 118 to prevent selecting content items that can result in establishment of a communication session with provider 108.

Figure 3:
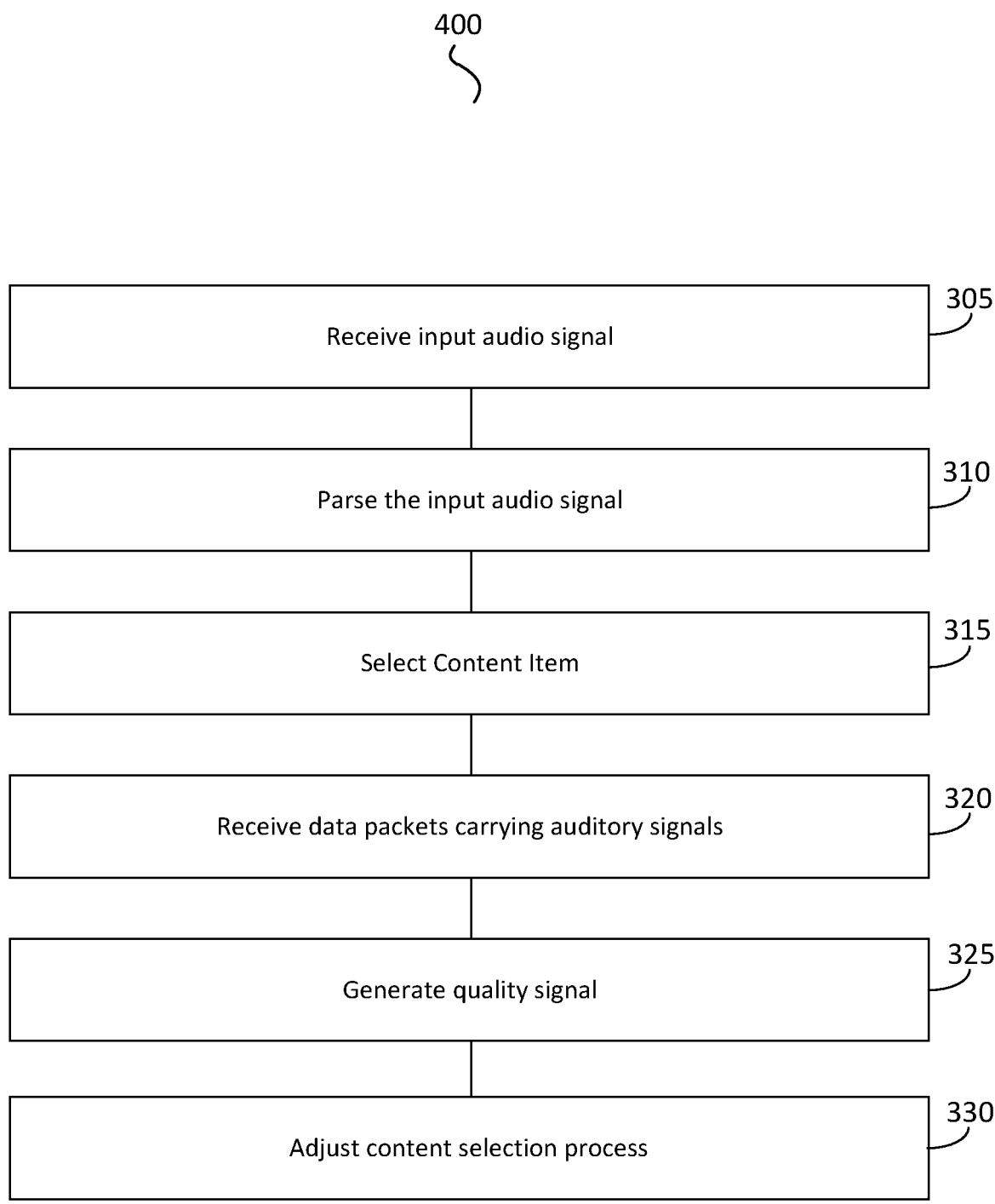
FIG. 3 is an illustration of a method of transmitting data over a computer network using feedback control system.

FIG. 3 is an illustration of an example method for performing dynamic modulation of packetized audio signals. The method 300 can be performed by one or more component, system or element of system 100 or system 400. The method 300 can include a data processing system receiving an input audio signal (ACT 305). The data processing system can receive the input audio signal from a client computing device. For example, a natural language processor component executed by the data processing system can receive the input audio signal from a client computing device via an interface of the data processing system. The data processing system can receive data packets that carry or include the input audio signal detected by a sensor of the client computing device (or client device).

At ACT 310, the method 300 can include the data processing system parsing the input audio signal. The natural language processor component can parse the input audio signal to identify a request and a trigger keyword corresponding to the request. For example, the audio signal detected by the client device can include "Okay device, I need a ride from Taxi Service Company A to go to 1234 Main Street." In this audio signal, the initial trigger keyword can include "okay device", which can indicate to the client device to transmit an input audio signal to the data processing system. A pre-processor of the client device can filter out the terms "okay device" prior to sending the remaining audio signal to the data processing system. In some cases, the client device can filter out additional terms or generate keywords to transmit to the data processing system for further processing.

The data processing system can identify a trigger keyword in the input audio signal. The trigger keyword can include, for example, "to go to" or "ride" or variations of these terms. The trigger keyword can indicate a type of service or product. The data processing system can identify a request in the input audio signal. The request can be determined based on the terms "I need". The trigger keyword and request can be determined using a semantic processing technique or other natural language processing technique.

In some cases, the data processing system can generate an action data structure. The data processing system can generate the action data structure based on the trigger keyword, request, third party provider device, or other information. The action data structure can be responsive to the request. For example, if the end user of the client computing device requests a taxi from Taxi Service Company A, the action data structure can include information to request a taxi service from Taxi Service Company A. The data processing system can select a template for Taxi Service Company A, and populate fields in the template with values to allow the Taxi Service Company A to send a taxi to the user of the client computing device to pick up the user and transport the user to the requested destination.

At ACT 315, the data processing system can select a content item. For example, a content selector component can receive the trigger keyword, request or action data structure and select a content item via a real-time content selection process. The selected content item can correspond to a content provider, service provider, or other third party provider. The client device can interact with the content item to establish a communication session with the provider of the content item or other device associated with the content item. The device associated with the content item can interact with the client device using a conversational API, such as an NLP.

At ACT 320, a feedback monitor component can receive data packets carrying auditory signals transmitted between the client device and a conversational application programming interface that established a communication session with the client device responsive to interaction with the content item. At ACT 325, the feedback monitor component can measure a quality or characteristic of the communication session based on the auditory signals, and generate a quality signal based on the measured characteristic. At ACT 330 the feedback monitor component or data processing system can adjust the real-time selection process based on the quality signal.

Figure 4:
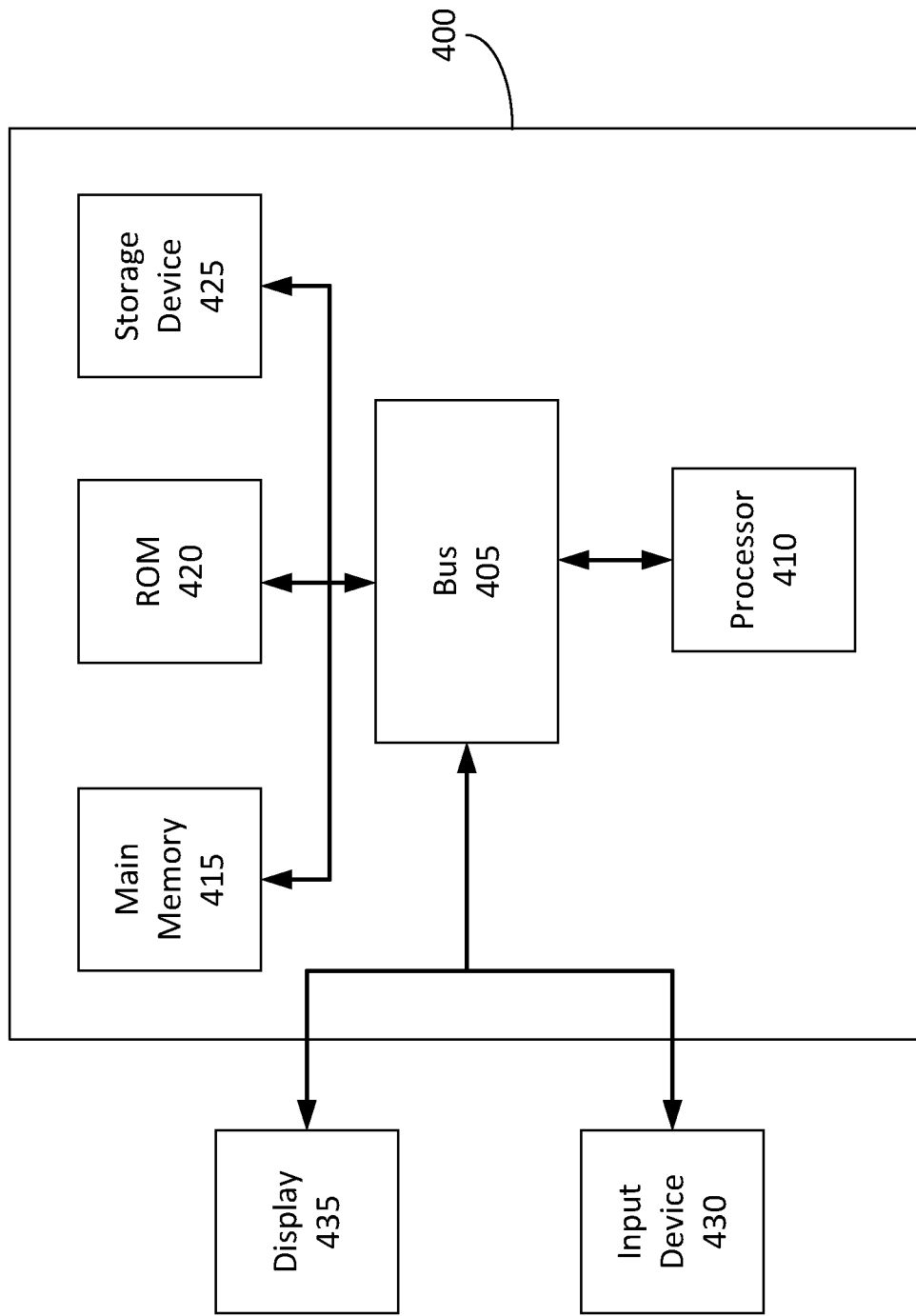
FIG. 4 is a block diagram illustrating a general architecture for a computer system that can be employed to implement elements of the systems and methods described and illustrated herein.

FIG. 4 is a block diagram of an example computer system 400. The computer system or computing device 400 can include or be used to implement the system 100, or its components such as the data processing system 102. The data processing system 102 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 150 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 116, content selector component 118, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 150 or the content provider computing device 155 or the service provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110 or the content selector component 125 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the data processing system 102 can select a content item for a subsequent action (e.g., for the third action 215) based in part on data from a prior action in the sequence of actions of the thread 200, such as data from the second action 210 indicating that the second action 210 is complete or about to begin. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for data transmissions over a computer network, comprising:
   a data processing system comprising one or more processors and memory;
   a natural language processor component executed by the data processing system to:
      receive, via an interface of the data processing system, data packets comprising an input audio signal detected by a sensor of a client device;
      establish a communication session responsive to the input audio signal; and
      parse the input audio signal to identify a request and a keyword associated with the request;
   a feedback monitor component to:
      determine a characteristic of the communication session based on the input audio signal; and
      generate a quality signal based on the characteristic; and
   a content selector component executed by the data processing system to:
      receive the keyword identified by the natural language processor component;
      adjust a real-time content selection process based on the quality signal; and
      select a content item responsive to the request and the keyword via the real-time content selection process adjusted based on the quality signal.

2. The system of claim 1, comprising:
   the data processing system to receive second data packets carrying auditory signals transmitted between the client device and a conversational application programming interface that established a second communication session with the client device responsive to interaction with the content item; and
   determine a second quality signal based on a second characteristic associated with the second communication session.

3. The system of claim 2, wherein the conversational application programming interface is executed by a third party provider device or the data processing system.

4. The system of claim 1, comprising:
   the feedback monitor component to forward data packets carrying one or more input audio signals to the natural language processor component to determine a first characteristic of the one or more input audio signals at a first time interval, and a second characteristic of the one or more input audio signals at a second time interval subsequent to the first time interval; and measure the characteristic based on a comparison of the first characteristic and the second characteristic.

5. The system of claim 1, wherein the characteristic includes at least one of amplitude, frequency, tempo, tone, or pitch.

6. The system of claim 1, wherein the characteristic indicates a sentiment of a user associated with the client device.

7. The system of claim 1, comprising the data processing system to:

determine the characteristic based on at least one of amplitude, frequency, tempo, tone, or pitch; and determine, based on the characteristic, a sentiment of a user associated with the client device.

8. The system of claim 1, comprising the data processing system to:

transmit a plurality of voice-based queries to the client device; and measure the characteristic based on responses to the plurality of voice-based queries.

9. The system of claim 1, comprising the data processing system to:

generate a query based on the quality signal being less than a threshold;

receive a response to the query from the client device; and generate a second quality signal based on the response.

10. The system of claim 1, comprising:

the data processing system to measure the characteristic based on a duration of the communication session.

11. The system of claim 1, comprising the data processing system to:

measure the characteristic based on network activity on multiple electronic surfaces; and aggregate quality signals measured from the multiple electronic surfaces to generate a summed quality signal.

12. The system of claim 1, comprising:

the data processing system to prevent the content selector component from selection, during the communication session, of a second content item responsive to the quality signal being less than or equal to a threshold.

13. The system of claim 1, comprising:

the data processing system to permit the content selector component to select, during the communication session, a second content item responsive to the quality signal being greater than or equal to a threshold.

14. The system of claim 1, comprising:

the feedback monitor component to determine a reaction of a user associated with the input audio signal based on the characteristic of the communication session.

15. A method of feedback control for data transmissions over a computer network, comprising:

receiving, by a data processing system comprising one or more processors, data packets comprising an input audio signal detected by a sensor of a client device;

establishing, by the data processing system, a communication session responsive to the input audio signal;

parsing, by the data processing system, the input audio signal to identify a request and a keyword associated with the request;

determining, by the data processing system, a characteristic of the communication session based on the input audio signal;

generating, by the data processing system, a quality signal based on the characteristic;

adjusting, by the data processing system, a real-time content selection process based on the quality signal;

selecting, by the data processing system, a content item responsive to the request and the keyword via the real-time content selection process adjusted based on the quality signal.

16. The method of claim 15, comprising:

receiving second data packets carrying auditory signals transmitted between the client device and a conversational application programming interface that established a second communication session with the client device responsive to interaction with the content item; and determining a second quality signal based on a second characteristic associated with the second communication session.

17. The method of claim 15, comprising:

receiving data packets carrying one or more input audio signals;

determining a first characteristic of the one or more input audio signals at a first time interval, and a second characteristic of the one or more input audio signals at a second time interval subsequent to the first time interval; and measuring the characteristic based on a comparison of the first characteristic and the second characteristic.

18. The method of claim 15, wherein the characteristic includes at least one of amplitude, frequency, tempo, tone, or pitch.

19. The method of claim 15, wherein the characteristic indicates a sentiment of a user associated with the client device.

20. The method of claim 15, comprising:

transmitting a plurality of voice-based queries to the client device; and measuring the characteristic based on responses to the plurality of voice-based queries.

* * * * *